US00RE42265E

(19) United States
(12) Reissued Patent
Hughes

(10) Patent Number: US RE42,265 E
(45) Date of Reissued Patent: Apr. 5, 2011

(54) CUT RESISTANT YARNS FOR GLOVE AND SLEEVES, GLOVES AND SLEEVES MADE WITH SUCH YARNS AND METHODS OF MAKING SUCH CUT RESISTANT YARNS

(75) Inventor: Griffith W. Hughes, Wayne, PA (US)

(73) Assignee: Banom, Inc., Wayne, PA (US)

(21) Appl. No.: 12/182,272

(22) Filed: Jul. 30, 2008

Related U.S. Patent Documents

Reissue of:
(64) Patent No.: 7,185,481
Issued: Mar. 6, 2007
Appl. No.: 11/180,157
Filed: Jul. 13, 2005

U.S. Applications:
(60) Provisional application No. 60/653,010, filed on Feb. 15, 2005.

(51) Int. Cl.
*D02G 3/22* (2006.01)
(52) U.S. Cl. ..... 57/210; 57/3
(58) Field of Classification Search ..... 57/210
See application file for complete search history.

(56) References Cited

U.S. PATENT DOCUMENTS

| | | | | |
|---|---|---|---|---|
| 4,350,731 | A * | 9/1982 | Siracusano | 442/270 |
| 4,509,320 | A | 4/1985 | Maeda | |
| 5,464,684 | A * | 11/1995 | Vogelsang et al. | 442/198 |
| 5,628,172 | A * | 5/1997 | Kolmes et al. | 57/210 |
| 5,721,179 | A * | 2/1998 | Shi et al. | 442/203 |
| 2004/0128973 | A1 | 7/2004 | Morikawa | |

* cited by examiner

*Primary Examiner* — Shaun R Hurley
(74) *Attorney, Agent, or Firm* — Caesar, Rivise, Bernstein, Cohen & Pokotilow, Ltd.

(57) ABSTRACT

Cut resistant yarns suitable for knitting gloves and sleeves and methods of making the yarns are disclosed. The yarns are made up of a bundle of continuous filaments formed of a synthetic material, e.g., polyethylene, polypropylene, nylon or polyolefin, and a stretchable yarn, e.g., Spandex® or Lycra®. The yarns are made in such a manner that when completed the continuous filaments are substantially parallel to one another and to the longitudinal axis of the yarn so that items made from them will not twist or curl up, yet will provide good resistance to cutting.

17 Claims, 4 Drawing Sheets

FIG.1
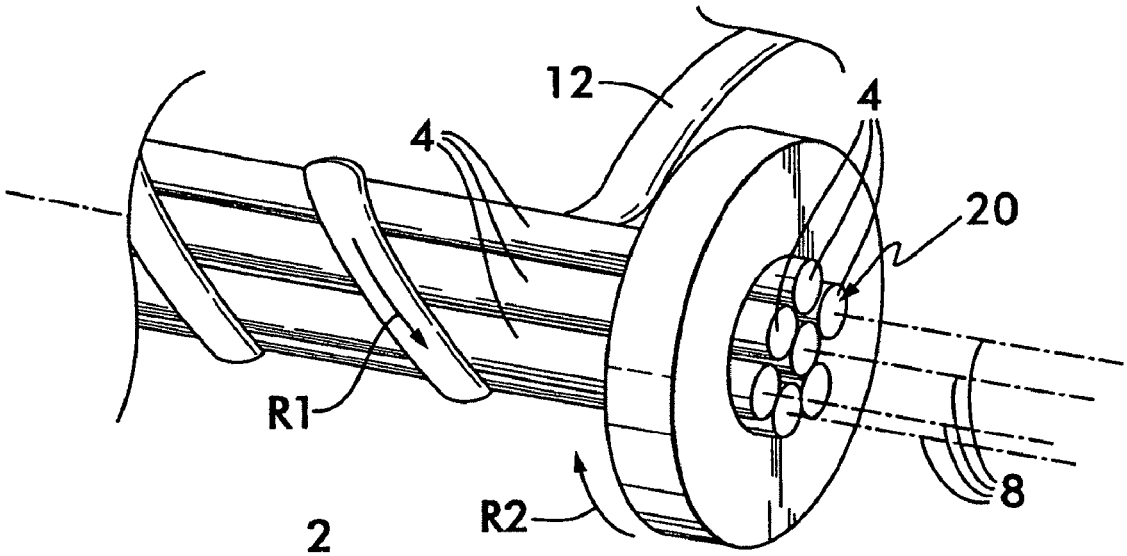
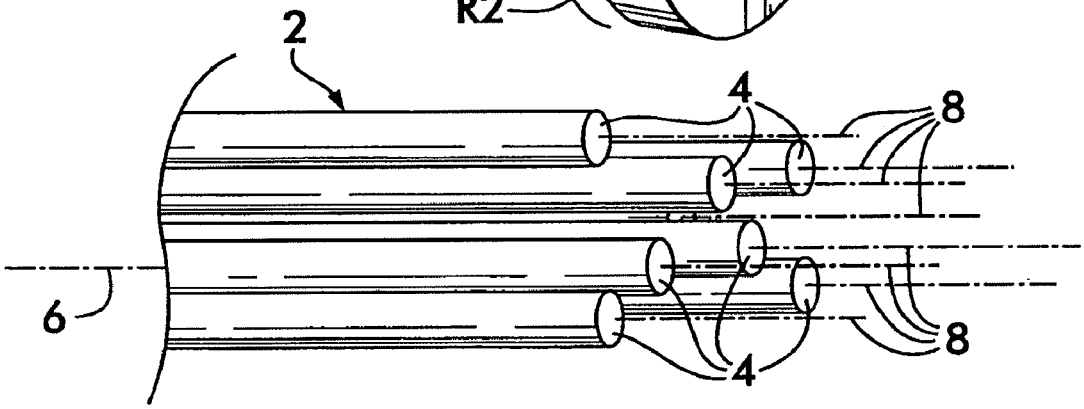
FIG.2 (PRIOR ART)
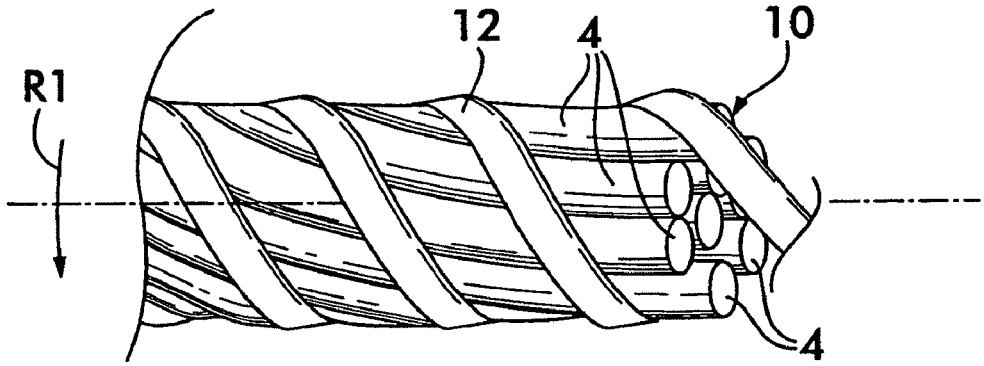
FIG.3 (PRIOR ART)

CUT RESISTANT YARNS FOR GLOVE AND SLEEVES, GLOVES AND SLEEVES MADE WITH SUCH YARNS AND METHODS OF MAKING SUCH CUT RESISTANT YARNS

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority from provisional U.S. Patent Application No. 60/653,010, filed on Feb. 15, 2005.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

BACKGROUND OF THE INVENTION

1. Field of Invention

This invention relates generally to cut resistant yarns and more particularly to cut resistant yarn for gloves or sleeves.

2. Description of Related Art

Knitted "work" gloves formed of conventional materials, such as cotton or poly-cotton provide some measure of protection from injury and some cushioning for the hand of workers, but are notoriously deficient insofar as providing resistance to cutting. Thus, it is a common practice to knit work gloves of cut resistant yarns. Most cut resistant yarns are formed of filaments—i.e., they are a bundle of continuous filaments or fibers. The term filaments and fibers are used interchangeably herein, and may be given the same general meaning, e.g., microscopically, looking like a bundle of fishing lines.

Cut resistance is obtained by several factors. One factor can be deemed to be the tendency to produce "slippage." In particular, when a blade or other sharp instrument passes over the yarn, it slides along the smooth surfaces of the fiber bundle, rather than catching on the yarn, which action would result in a tendency to cut the yarn. Tensile strength is another factor in establishing cut resistance. In this regard, the shear strength of the fiber is selected to be so strong that it prevents the fiber from breaking. The abrasive action of the fiber is also a factor, since the harder the fiber, the greater the tendency to dull the cutting edge, thereby reducing the tendency of the fiber to be cut. Another significant factor is what may be called "rolling." This is the ability of the fibers of the yarn to twist or roll about their longitudinal axis as the blade moves across the yarn. Such rolling action enhances cut resistance by denying the cutting edge a stationary surface to cut.

Filament yarns, due to their structure, will not stretch. Stretchability is of considerable importance in order to readily knit a viable, low-cost glove. Consequently, the knitted glove industry, typically plies these yarns with an elastic or stretchable yarn such as Spandex® or Lycra® alongside the filament yarn and then wraps the stretchable yarn under tension in a helical pattern around the filament yarn, with the helix spacing of several twists of stretchable yarn per inch of the filament yarn (i.e., the fiber bundle). When the tension is relaxed, the resulting combined yarn is a stretchable filament yarn that can be knit into gloves or sleeves.

Unfortunately, the plying process forces the filament yarn to twist in the same direction as the stretchable yarn is plied (wound). When this happens two things occur. First, the ability of each fiber of the bundle to roll individually is restricted, thus reducing cut resistance of the combined yarn. Second, the combined yarn then develops a twist to it.

When gloves and arm sleeves are knitted, any yarn that is twisted, such as the combined yarn just described, will cause a torque. When this happens, glove fingers become twisted and arm sleeves begin to wrap around the arm, which can reduce cut resistance because it is now restricting the ability of the sleeve to stretch. The industry calls this torque in the yarn an "S." To counteract S torque, it is a common practice in the industry to add another yarn twisted in the opposite direction as the stretchable yarn. This additional yarn is frequently referred to as the "Z" or "zed" yarn. The use of a Z yarn in the combined yarn allows the fingers of a glove knitted from the combined yarn to be flat and a sleeve knitted of it to relax. The Z yarn can be of lesser denier than the stretchable yarn and can be wrapped around the stretchable yarn in the opposite direction to counteract the twist. Alternatively, the Z yarn can be of the same denier as the stretchable yarn and can be run parallel to it and the two combined yarns knitted together so that the twist provided by both yarns counteract each other.

While the use of a Z yarn has the foregoing advantage, it is not without cost. In this regard the use of the additional reverse twisted Z yarn increases the cost of the resulting yarn due to the cost of the Z yarn itself. Moreover, if the Z yarn is counter-wrapped about the stretchable yarn, there is the additional manufacturing costs inherent in effecting that wrapping action. If the Z yarn is run parallel to the stretchable yarn and then the two are knitted together, the resulting glove or sleeve will be considerably thicker (which may be undesirable from the standpoint of flexibility). To keep costs down, it is a common practice to use low cost materials for the Z yarn. Unfortunately, such low cost materials are inferior in that they are not cut resistant. When these low cost Z yarns are added to a glove or sleeve, they tend to break down or cut more easily. When this happens the knitted product falls apart.

Thus, while the above yarns may be generally suitable for their intended purposes, they leave something to be desired from one or more of the following factors, ease of manufacture, effectiveness, reliability and cost.

BRIEF SUMMARY OF THE INVENTION

This invention is directed to cut resistant, stretchable yarns and method of making them. The yarns are suitable for knitting gloves and sleeves. The yarns each have a longitudinal axis. Each yarn comprises a bundle of continuous filaments formed of a synthetic material and a stretchable yarn.

In accordance with one aspect of the invention each of the continuous filaments of the bundle of filaments has a longitudinal axis. The bundle of filaments is twisted in a first rotational direction with respect to the longitudinal axis of the yarn to apply a torque to the bundle in the first rotational direction. The stretchable yarn is wound under tension about the bundle of filaments in a helical pattern in a second and opposite rotational direction with respect to the longitudinal axis of the yarn to apply a torque to the bundle in the second rotational direction. The torque in the first direction substantially cancels the torque in the second direction, whereupon after the stretchable yarn has been made the longitudinal axes of the filaments of the bundle are substantially parallel to one another and to the longitudinal axis of yarn.

In accordance with another aspect of this invention the stretchable yarn is of substantially smaller denier than the bundle of filaments and is initially under tension to cause it to stretch. Each of the continuous filaments of the bundle of filaments has a longitudinal axis and is oriented initially parallel to the other filaments of the bundle. The bundle of filaments is helically wound about the stretched stretchable yarn to apply a torque in a first rotational direction to the filaments of the bundle to cause them to twist with respect to one another in the first rotational direction. The bundle of filaments and the stretchable yarn are thereafter twisted in a second and opposite rotational direction with respect to the longitudinal axis of the yarn to apply a torque to the bundle and to the stretchable yarn in the second rotational direction. The torque in the second direction substantially cancels the torque in the first direction, whereupon the bundle of filaments again assumes the condition wherein all of the filaments of the bundle are parallel to one another and to the longitudinal axis of the yarn and the stretchable yarn twists about its longitudinal axis and moves to a position wherein it is helically disposed around the parallel filaments of the bundle.

In accordance with still another aspect of this invention the continuous filaments of the bundle of filaments are pre-twisted with respect to one another whereby the filaments have a torque in a first rotational direction applied to them. This bundle of pre-twisted filaments is helically wound about the small denier stretchable yarn to apply a torque in a second rotational direction to those filaments to cause them to untwist with respect to one another in the second rotational direction, i.e., the torque in the second direction substantially cancels the torque in the first direction, whereupon the bundle of filaments again assumes the condition wherein all of the filaments of the bundle are parallel to one another and to the longitudinal axis of the yarn, and the stretchable yarn twists about its longitudinal axis and moves to a position wherein it is helically disposed around the parallel filaments of the bundle.

Other aspects of this invention entail methods of producing the cut resistant, stretchable yarns summarized above and of gloves and sleeves formed of such yarns.

BRIEF DESCRIPTION OF SEVERAL VIEWS OF THE DRAWINGS

The invention will be described in conjunction with the following drawings in which like reference numerals designate like elements and wherein:

FIG. 1 is an illustration in the form of an isometric view of a cut resistant yarn constructed in accordance with this invention in the process of being made;

FIG. 2 is an illustration in the form of an isometric view of a prior art cut resistant yarn formed of a bundle of continuous filaments;

FIG. 3 is an illustration in the form of an isometric view of a portion of a prior art cut resistant stretchable yarn;

DETAILED DESCRIPTION OF THE INVENTION

Figure 4:
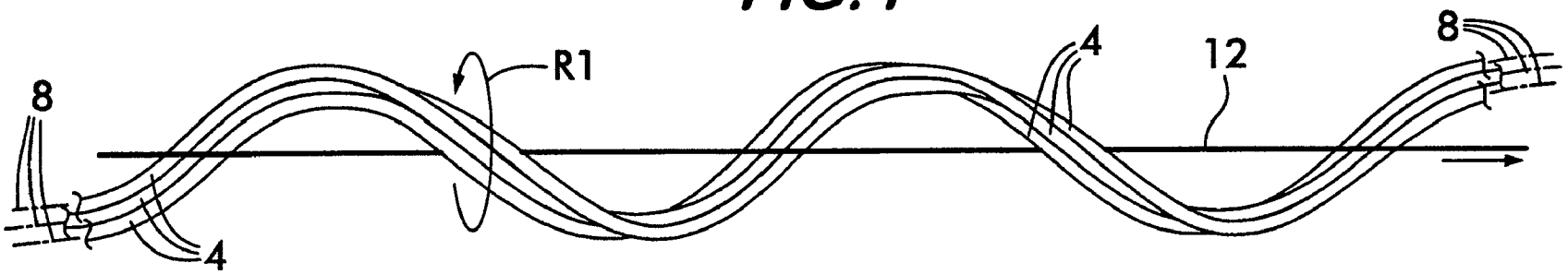
FIG. 4 is an illustration showing a step in a process of making an alternative embodiment of a cut resistant, stretchable yarn constructed in accordance with another aspect of this invention.

Referring now to the various figures of the drawing wherein like reference characters refer to like parts, there is shown at 20 in FIG. 1 a cut resistant, stretchable yarn constructed in accordance with one exemplary embodiment of this invention shown in the process of being made by one method of this invention. Before describing the details of that yarn and the method of making it, a brief description of the prior art yarns discussed above is in order.

To that end, in FIG. 2 there is shown a portion of a prior art yarn 2 in the form of a bundle of single, continuous filaments 4. The yarn 2 has a longitudinal axis 6. Each of the filaments 4 of the bundle is of the same material, e.g., a conventional material such as polyethylene, polypropylene, nylon and polyolefin, and has its own longitudinal axis 8. The filaments 4 of the bundle are disposed in a side-by-side array and are spaced slightly from one another, but with their respective longitudinal axes 8 being generally parallel to one another and to the longitudinal axis 6 of the yarn 2. Accordingly, as discussed above, each of the filaments 4 of the bundle can roll or twist about its own longitudinal axis to enhance the cut-resistance of a glove or sleeve knitted from such a yarn.

In FIG. 3 there is shown a stretchable yarn 10 for use in knitted gloves and arm sleeves. The stretchable yarn 10 is like that discussed above. In particular, the yarn 10 is in the form of a bundle of continuous filaments 4, but with a stretchable or elastic yarn 12, e.g., Spandex®, Lycra® or similar continuous filament materials, wound helically about the filaments of the bundle in one rotational direction with respect to the longitudinal axis 6 of the bundle. In the embodiment shown, the stretchable yarn 12 is wrapped or wound in the counterclockwise direction designated by the arrow R1.

As will be appreciated by those skilled in the art, when the stretchable yarn 12 is placed under tension and then wound helically about the periphery of the bundle of filaments 4 it creates a torque on those filaments, whereupon when the resulting yarn is released, the filaments 4 twist and become effectively "locked-up." In particular, as discussed above this twisting action restrains those filaments so that they are not able to roll individually about their respective longitudinal axes, thereby resulting in a yarn whose cut-resistance is reduced. Moreover, the resulting yarn 10 itself develops a twist to it, whereupon the fingers of gloves or the body of arm sleeves knitted of such a yarn will twist up. As also pointed out above, in order to prevent the tendency of gloves and sleeves knitted of such yarns from curling up, the yarn 10 is commonly wound with a Z yarn in the opposite rotational direction to counteract the torque applied by the stretchable yarn.

FIG. 1 illustrates the yarn 20 of this invention, which overcomes the disadvantage of the prior art yarns. In particular, in accordance with one aspect of this invention, the yarn 20 is a cut resistant, curl or twist resistant, stretchable yarn made up of plural continuous filaments 4, that are arranged in an array or bundle so that all of their respective axes 8 are parallel to one another. A tensioned, stretchable fiber or yarn 12 is wrapped or wound about the bundle of filaments 4, in a helical pattern about the yarn's longitudinal axis 6 in one rotational direction, e.g., the counterclockwise direction R1, to render the resulting yarn stretchable. However, at the same time that the stretchable yarn 12 is wound in the one rotational direction R1 about the bundle of filaments 4, the entire bundle of filaments is itself rotated, by means of apparatus 100, in the opposite rotational direction R2 shown by the clockwise directed arrow. The apparatus 100 to apply the counter-rotation to the yarn can be any suitable device for gripping the bundle and twisting it in the rotational direction R2.

The counter-rotation of the filament bundle as the stretchable yarn is being applied (wound about the filaments) applies a torque that is in the opposite direction to the torque applied by the stretchable yarn as it is wound about the bundle. The two torques essentially cancel each other so that end result is that when the yarn 20 is completed and released from the equipment for making it the filaments 4 of the yarn 20 run parallel to one another and can roll individually about their own respective longitudinal axis. This later feature increases the cut resistance, while the former feature ensures that the resulting yarn itself isn't twisted. Accordingly, there is no need to make use of an oppositely wound Z yarn, as has typified prior art stretchable yarns.

Figure 9:
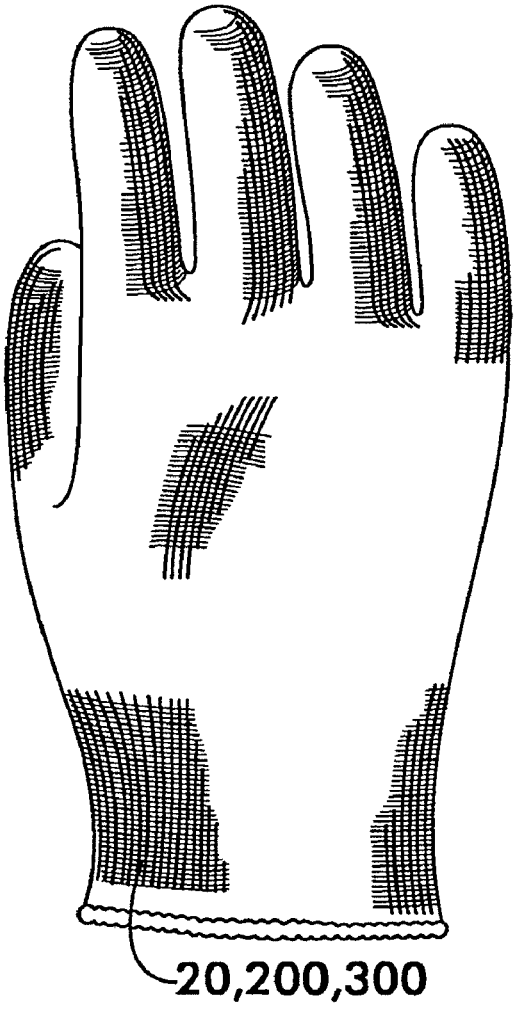
FIG. 9 is an illustration of an exemplary glove knitted of any of the cut resistant yarns of this invention.
Figure 10:
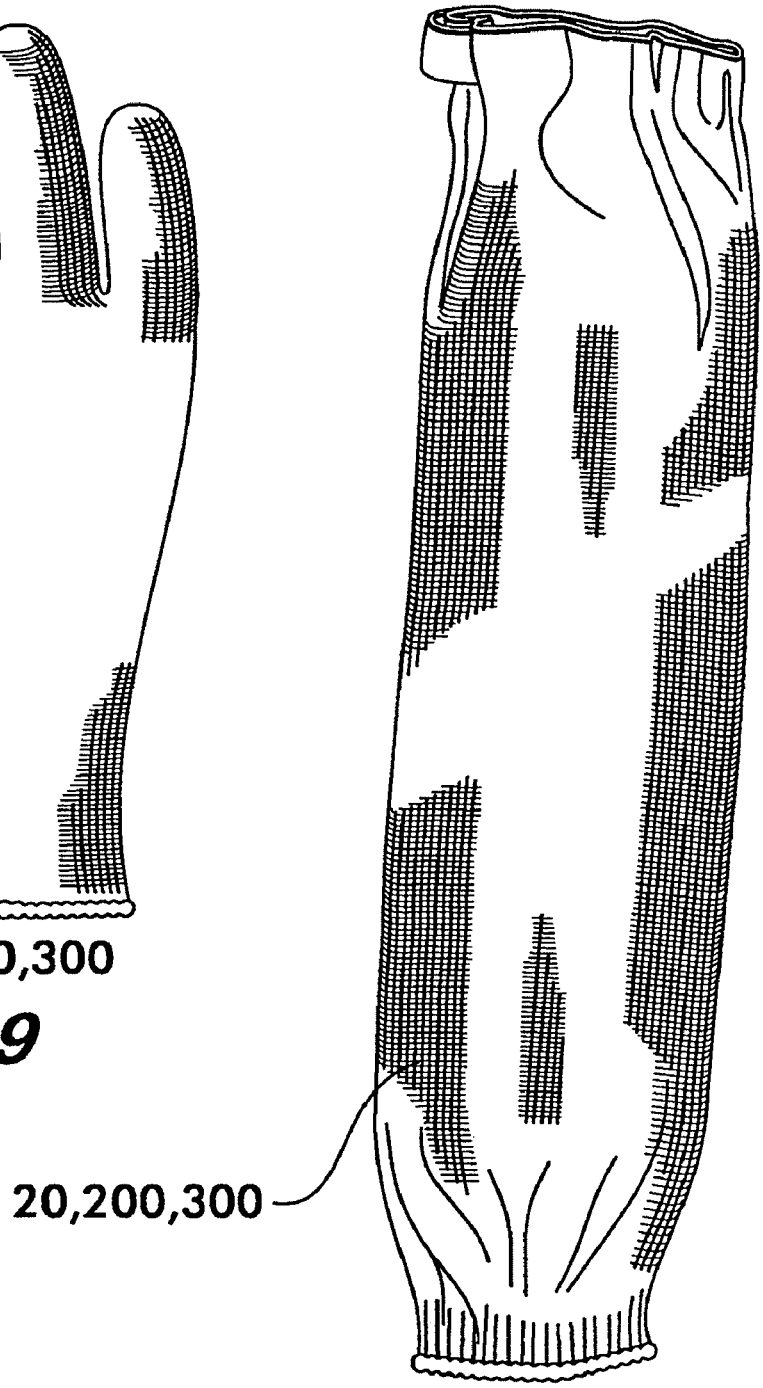
FIG. 10 is an illustration of an exemplary arm sleeve knitted of any of the cut resistant yarns of this invention.

Any suitable materials can be used for making the yarn 20. For example, the continuous filaments can be selected from the group comprising polyethylene, polypropylene, nylon and polyolefin. Those materials can have a denier in the range of approximately 100 to approximately 1200. The stretchable yarn can be selected from the group comprising Spandex® and Lycra® and can have a denier in the range of approximately 40 to approximately 70. One particularly suitable yarn for a glove, like that shown in FIG. 9, or an arm sleeve like that shown in FIG. 10 is formed of continuous filaments of Dyneema, having a denier of 400 and a stretchable yarn of Lycra®, having a denier of 40 denier. It should be understood that these materials and their denier are merely exemplary of numerous materials and deniers which can be used, depending upon the ultimate yarn and/or product to be made, e.g., knitted, therefrom.

Figure 5:
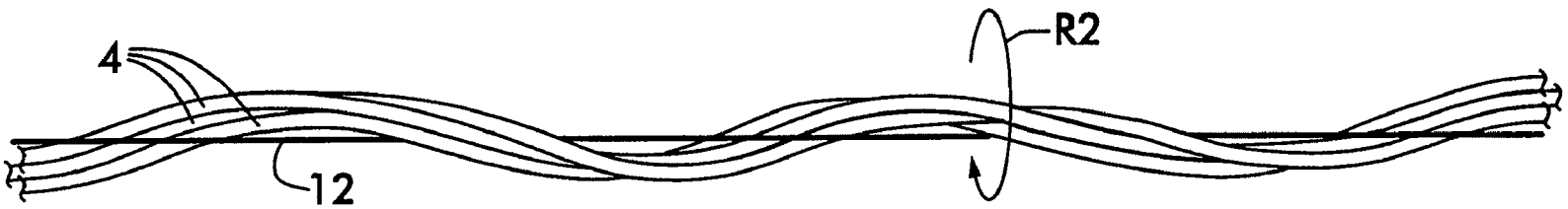
FIG. 5 is an illustration of a later step in the process shown in FIG. 4 for making the alternative embodiment of the cut resistant, stretchable yarn.
Figure 6:
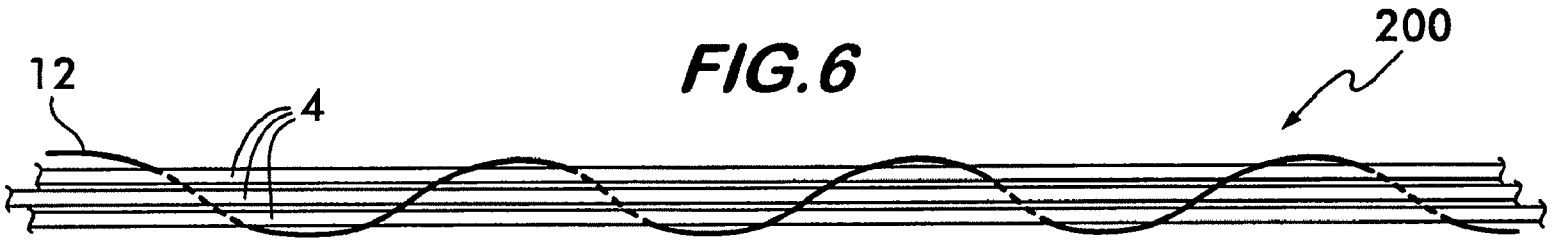
FIG. 6 is an illustration of the alternative embodiment of the finished cut resistant, stretchable yarn shown made by the process shown in FIGS. 4 and 5.

In FIG. 6 there is shown an alternative embodiment of a stretchable, cut resistant, curl or twist resistant yarn 200 constructed in accordance with this invention. That yarn is made by an alternative method of this invention shown in FIGS. 4 and 5. As will be seen, unlike the production of the yarn 20, the production of the yarn 200 does not entail helically wrapping the stretchable yarn 12 about the bundle of filaments 4, although when the yarn is finished the stretchable yarn will extend helically around the filaments of the bundle (as will be described later). The making of the yarn 200 entails providing a small denier stretchable fiber or yarn 12 and stretching or tensioning it so that it extends generally linearly as shown in FIG. 4. The denier of the stretchable fiber or yarn 12 is substantially less than the denier of the bundle of filaments, e.g., the denier of the fiber 12 is 40 to 70 denier. A bundle of continuous filaments 4 like described above is provided to complete the yarn. In particular, the filaments 4 of the bundle are disposed so that their longitudinal axes 8 are parallel to one another. This parallel bundle of filaments is then wound by apparatus (not shown) helically about the stretched stretchable yarn 12 in a first rotational direction, e.g., counterclockwise as shown by the direction of the arrow R1, to apply a torque in that rotational direction to the filaments 4. This action causes the filaments 4 to twist with respect to one another in that rotational direction as clearly shown in FIG. 4. The bundle of twisted continuous filaments 4 and the stretched, but untwisted, stretchable yarn 12 are then twisted as a unit as shown in FIG. 5. In particular, they are twisted in a second and opposite rotational direction, e.g., clockwise as shown by the direction of the arrow R2, by apparatus like the apparatus 100 shown in FIG. 1, to apply a torque to the bundle of filaments 4 and to the stretched fiber 12 in that second rotational direction R2. The torque that is produced on the filaments 4 and stretchable fiber 12 in the R2 direction from the twisting action substantially cancels the torque on the filaments 4 in the first (R1) direction that resulted from winding that bundle of filaments about the fiber 12. Thus, when the yarn 200 is released from the apparatus 100 the filaments 4 of the bundle again assume their parallel condition, i.e., their condition prior to being wound about the fiber 12. The release of the yarn 200 from the apparatus enables the stretched, stretchable yarn 12 to relax. Since it will have been twisted about its longitudinal axis by the apparatus 100, and since it is of small denier, the stretchable yarn attempts to untwist, thereby causing it to move outside of the bundle parallel filaments 4 and to assume a helical orientation. Thus, the resulting, i.e., finished, yarn 200 looks like that shown in FIG. 6.

It should be pointed out at this juncture that the direction of twisting of the filaments as described above is merely exemplary. Thus, the filaments 4 of the bundle can be twisted about the stretched fiber 12 in the clockwise direction and then that bundle and the stretched stretchable fiber can be rotated as a unit in the counterclockwise direction by the apparatus 100 to result in a yarn exhibiting the same properties as the yarn 200 described above but whose appearance is slightly different, i.e., the direction of the spiral of the stretchable yarn being opposite to that shown in FIG. 6.

Figure 7:
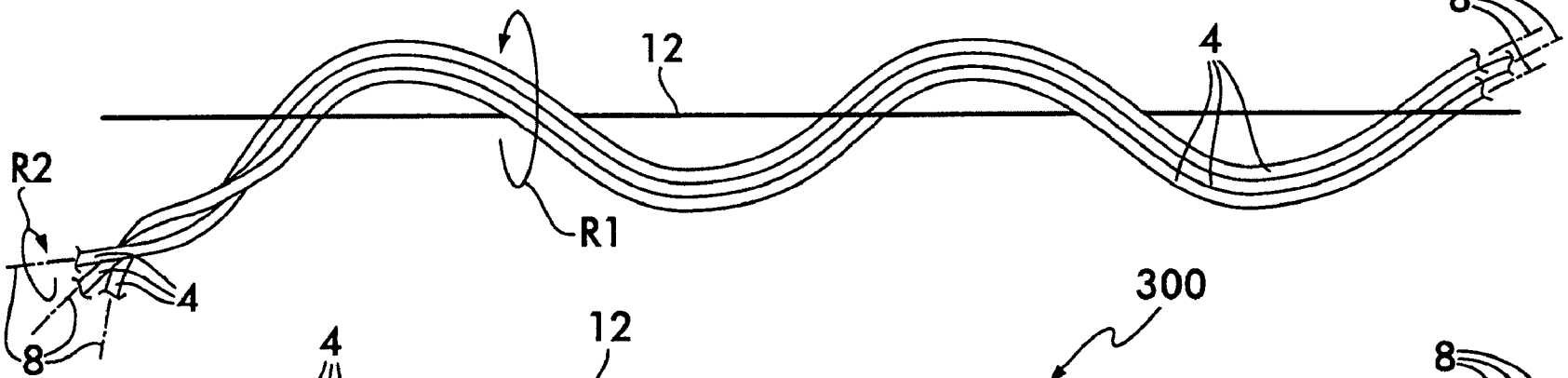
FIG. 7 is an illustration showing the process of making another alternative embodiment of a cut resistant, stretchable yarn constructed in accordance with another aspect of this invention.
Figure 8:
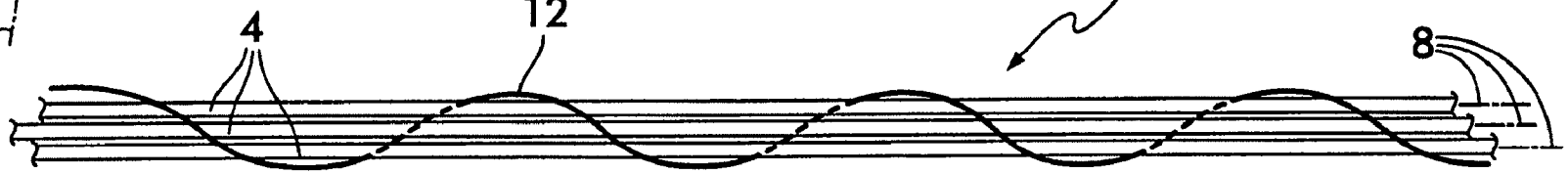
FIG. 8 is an illustration of the other alternative embodiment of the finished cut resistant, stretchable yarn shown made by the process shown in FIG. 7.

In FIG. 8 there is shown an alternative embodiment of a stretchable, cut resistant and curl or twist resistant yarn 300 constructed in accordance with this invention. That yarn is made by an alternative method of this invention shown in FIG. 7. The process of making the yarn 300 is slightly different than the process from making the yarn 200, although the resulting yarns are visually similar. In particular, the making of the yarn 300 also entails providing a stretchable fiber or yarn 12, like that described with reference to the method shown in FIGS. 4-6, and stretching or tensioning it so that it extends generally linearly. A bundle of continuous filaments 4 is provided to complete the yarn. However, unlike the method shown in FIGS. 4-5, the filaments 4 of the bundle of filaments used in the method shown in FIG. 8 are not initially oriented parallel to one another. To the contrary, the filaments 4 of the bundle are pre-twisted in a first rotational direction, e.g., the clockwise direction R2 as shown in FIG. 7. This pre-twisting produces a torque in those filaments in that first rotational direction. The pre-twisted bundle of filaments 4 is then wound by apparatus (not shown) helically about the stretched stretchable yarn 12 in a second and opposite rotational direction R2, e.g.,counterclockwise. This action applies a torque in that second rotational direction to the filaments 4 that effectively counteract or cancels the torque resulting from the pre-twisting of those filaments, whereupon the filaments 4 straighten out, i.e., assume their parallel condition. The straightening of the filaments of the bundle resulting from the twisting action when that bundle is wrapped helically about the stretched fiber 12 causes the stretchable fiber 12 to move to the outside of the parallel filaments 4 when the yarn 300 is released from the apparatus and to spiral about those parallel filaments 4 so that the resulting (i.e., finished) yarn 300 looks like that shown in FIG. 8.

It should be pointed out at this juncture that the direction of twisting of the filaments as described above is merely exemplary. Thus, the filaments 4 of the bundle can be pre-twisted in the counterclockwise direction R2 and then that twisted bundle can be wrapped about the stretched stretchable fiber 12 in the clockwise direction R1 to result in a yarn exhibiting the same properties as the yarn 300 described above but whose appearance is slightly different, i.e., the direction of the spiral of the stretchable yarn being opposite to that shown in FIG. 8.

As should be appreciated by those skilled in the art the yarns of the subject invention are stretchable and cut resistant, yet do not have any substantial residual torque thereon which would tend to cause any item, e.g., a glove, arm sleeve, etc., to be knitted from such yarns to curl or otherwise twist. In accordance with the methods of this invention the formation of each of the yarns is achieved by creating some torque on the yarn which overcomes any other torque existing thereon, so that the continuous filaments of the bundle extend parallel to one another, thereby enabling them to roll somewhat with respect to one another. In particular, in accordance with the first embodiment the bundle of continuous filaments, is counter-twisted, while plying, i.e., helically winding, a stretchable yarn about the filament yarn. The result is a finished yarn whose individual filaments are able to twist and roll individually rather than as a complete yarn. Such action results in significantly improved cut resistance.

The method of making the yarn according to the second exemplary embodiment also results in a yarn that exhibits similar properties to the yarn of the first embodiment insofar as stretchability, resistance to cutting and tendency not to curl or otherwise twist. However, that yarn and its method of production are different. Thus, that method entails tensioning the stretchable yarn 12 to cause it to stretch, winding the bundle of continuous filaments 4 helically about the stretchable yarn to apply a torque in a first rotational direction to said filaments to cause them to twist with respect to one another in the first rotational direction, and twisting the bundle of continuous filaments and the stretchable yarn in a second and opposite rotational direction to apply a torque thereto in the second rotational direction. The torque in the second direction substantially cancels the torque in the first direction, so that when the yarn is released the fibers of the bundle of filaments again assumes the parallel condition, with the stretchable yarn twisted helically around those filaments.

The method of making the yarn according to the third exemplary embodiment also results in a yarn that exhibits similar properties to the yarn of the second embodiment insofar as stretchability, resistance to cutting and tendency not to curl or otherwise twist. However, the method of production of that yarn is slightly different than the method of making the yarn of the second embodiment. In particular, like the method of the second embodiment the stretchable yarn 12 is stretched and the filaments of the bundle of filaments are wound helically around the stretched stretchable yarn. However, unlike that method the filaments 4 of the bundle of filament are pre-twisted in one rotational direction so that when they are wound helically about the stretchable yarn 12 in the second and opposite rotational direction, that action causes them to untwist, i.e., a counter torque is produced offsetting the initial torque placed on those filaments when they are pre-twisted. This results in a yarn, which to all intents and purposes is the same as the yarn of the second embodiment.

As should be appreciated from the foregoing, the yarns of this invention do not require the use of a Z yarn. Thus, gloves, sleeves or another item made of that yarn can be knitted more economically. Moreover, such gloves, sleeves, etc., knitted of those yarns can provide better protection to the wearer, e.g., protection from accidental cutting, with a lighter weight product. This has the obvious advantage of adding to wearing comfort and enabling dexterity. In short the yarns of the subject invention result in knitted products that are more cost effective, have a higher cut resistance and will wear longer than the prior art items.

Without further elaboration the foregoing will so fully illustrate my invention that others, made by applying current or future knowledge, readily adapt the same for use under various conditions of service.

What is claimed is:

1. A cut resistant, stretchable yarn suitable for knitting gloves and sleeves, said yarn having a longitudinal axis and comprising a stretchable *second* yarn and a bundle of continuous filaments formed of a synthetic material, said stretchable *second* yarn being of substantially smaller denier than the bundle of filaments [and being initially under tension to cause it to stretch], each of said continuous filaments of the bundle of continuous filaments having a longitudinal axis [and], *said bundle* being *in a* twisted [with respect to one another whereby] *condition wherein* the *bundle of* filaments [have] *has* a torque in a first rotational direction [applied to them], said bundle of continuous filaments being helically wound about the [stretched] stretchable *second* yarn [to apply] *wherein said bundle of filaments has* a torque in a second rotational direction [to said filaments to cause them to untwist with respect to one another] *establishing a force* in said second rotational direction, said torque in said second *rotational* direction substantially cancelling said torque in said first *rotational* direction, whereupon said bundle of filaments [again] assumes [the] *a* condition wherein all of said filaments of said bundle *have a substantially zero torque and* are *substantially* parallel to one another and to the longitudinal axis of the [yam] *yarn* and the stretchable [yam] *second yarn* twists about [its] *the* longitudinal axis *of the yarn* and moves to a position wherein it is helically disposed around the [parallel] *bundle of* filaments [of said bundle].

2. The yarn of claim 1 wherein said continuous filaments are *formed from a material* selected from the group comprising polyethylene, polypropylene, nylon and polyolefin.

3. The yarn of claim 1 wherein said stretchable *second* yarn is *formed from a material* selected from the group comprising [Spandex®] *spandex* and Lycra®.

4. The yarn of claim 1 wherein said yarn comprises at least a portion of a glove or sleeve knitted from said yarn.

5. The yarn of claim 1 wherein said bundle of filaments has a denier in the range of approximately 100 to approximately 1200 and wherein said stretchable *second* yarn has a denier in the range of approximately 40 to approximately 70.

6. A method for making a cut resistant yarn suitable for knitting gloves and sleeves, said yarn having a longitudinal axis [and], comprising:

(A) providing a stretchable *second* yarn and a bundle of continuous filaments, *each* formed of a synthetic material, each of said continuous filaments of said bundle of continuous filaments having a longitudinal axis;

(B) twisting said *bundle of* filaments [with respect to one another] whereby the *bundle of* filaments [have] *has* a torque in a first rotational direction applied to [them] *it*;

(C) tensioning the stretchable *second* yarn to cause it to stretch;

(D) winding said bundle of continuous filaments about the stretched stretchable *second* yarn to apply a torque in a second rotational direction to said *bundle of continuous* filaments to cause [them] *it* to untwist [with respect to one another] in said second rotational direction, said torque in said second *rotational* direction substantially cancelling said torque in said first *rotational* direction; and releasing *said torque in the second rotational direction on* said bundle of filaments and *releasing said tension on* said stretchable *second* yarn, whereupon said bundle of *continuous* filaments [again] assumes [the] *a* condition wherein all of said filaments of said bundle are *substantially* parallel to one another and to the longitudinal axis of the yarn and the stretchable *second* yarn twists about its longitudinal axis and moves to a position wherein it is helically disposed around the parallel filaments of said bundle.

7. The method of claim 6 wherein said continuous filaments are selected from the group comprising polyethylene, polypropylene, nylon and polyolefin.

8. The method of claim 6 wherein said stretchable yarn is selected from the group comprising [Spandex®] *spandex* and Lycra®.

*9. A cut resistant, stretchable yarn, said yarn having a longitudinal axis, said yarn comprising:*

*a stretchable second yarn and a bundle of continuous filaments formed of a synthetic material, said stretchable second yarn being of substantially smaller denier than the bundle of filaments;*

*each of said continuous filaments of the bundle of continuous filaments having a longitudinal axis, said bundle being in a twisted condition wherein the bundle of filaments has a torque in a first rotational direction;*

*said bundle of continuous filaments being helically wound about the stretchable second yarn wherein said bundle of filaments has a torque in a second rotational direction establishing a force in said second rotational direction in said bundle of filaments, said torque in said second rotational direction substantially canceling said torque in said first rotational direction,*

*whereupon said bundle of filaments assumes a condition wherein all of said filaments of said bundle have a substantially zero torque and are substantially parallel to one another and the stretchable second yarn twists about the longitudinal axis of the yarn and moves to a position wherein it is helically disposed around the bundle of filaments.*

*10. The yarn of claim 9 wherein said continuous filaments are formed from a material selected from the group comprising polyethylene, polypropylene, nylon and polyolefin.*

*11. The yarn of claim 9 wherein said stretchable second yarn is formed from a material selected from the group comprising spandex and Lycra®.*

*12. The yarn of claim 9 wherein said yarn comprises at least a portion of a glove or sleeve knitted from said yarn.*

*13. The yarn of claim 9 wherein said bundle of filaments has a denier in the range of approximately 100 to approximately 1200 and wherein said stretchable second yarn has a denier in the range of approximately 40 to approximately 70.*

*14. A method for making a cut resistant yarn suitable for knitting gloves and sleeves, said yarn having a longitudinal axis, said method comprising:*

*(A) providing a stretchable second yarn and a bundle of continuous filaments, each formed of a synthetic material, each of said continuous filaments of said bundle of continuous filaments having a longitudinal axis;*

*(B) twisting said bundle of filaments whereby the bundle of continuous filaments has a torque in a first rotational direction applied to it;*

*(C) tensioning the stretchable second yarn to cause it to stretch;*

*(D) winding said bundle of continuous filaments about the stretched stretchable second yarn to apply a torque in a second rotational direction to said bundle of continuous filaments to cause it to untwist in said second rotational direction, said torque in said second rotational direction substantially canceling said torque in said first rotational direction, and*

*(E) releasing said torque in the second rotational direction on said bundle of filaments and releasing said tension on said stretchable second yarn,*

*whereupon said bundle of continuous filaments assumes a condition wherein all of said filaments of said bundle are substantially parallel to one another and the stretchable yarn twists about its longitudinal axis and moves to a position wherein it is helically disposed around the parallel filaments of said bundle.*

*15. The method of claim 14 wherein said step including providing the bundle of continuous filaments includes providing a bundle of filaments formed from a material selected from the group comprising polyethylene, polypropylene, nylon and polyolefin.*

*16. The method of claim 14 wherein said stretchable second yarn is formed from a material selected from the group comprising spandex and Lycra®.*

*17. A glove woven from a cut resistant, stretchable yarn, said yarn having a longitudinal axis, said yarn comprising:*

*a stretchable second yarn and a bundle of continuous filaments formed of a synthetic material, said stretchable second yarn being of substantially smaller denier than the bundle of filaments;*

*each of said continuous filaments of the bundle of continuous filaments having a longitudinal axis, said bundle being in a twisted condition wherein the bundle of filaments has a torque in a first rotational direction,*

*said bundle of continuous filaments being helically wound about the stretchable second yarn wherein said bundle of filaments has a torque in a second rotational direction establishing a force in said second rotational direction, said torque in said second rotational direction substantially canceling said torque in said first rotational direction,*

*whereupon said bundle of filaments assumes a condition wherein all of said filaments of said bundle have a substantially zero torque and are substantially parallel to one another and the stretchable second yarn twists about its longitudinal axis and moves to a position wherein it is helically disposed around the bundle of filaments.*

* * * * *